United States Patent [19]
Nakamura et al.
[11] Patent Number: 4,840,290
[45] Date of Patent: Jun. 20, 1989

[54] BULK LOADED COIN DISPENSING MACHINE

[75] Inventors: Shunichi Nakamura, Tokyo; Kouichi Iimura, Kawasaki; Kikuo Nakamura, Iruma; Susumu Ozawa, Niiza, all of Japan

[73] Assignee: Kabushiki Kaisha Sigma, Tokyo, Japan

[21] Appl. No.: 19,547

[22] Filed: Feb. 26, 1987

[30] Foreign Application Priority Data

| | | | |
|---|---|---|---|
| Mar. 1, 1986 | [JP] | Japan | 61-42828 |
| Mar. 1, 1986 | [JP] | Japan | 61-42829 |
| Mar. 31, 1986 | [JP] | Japan | 61-46158[U] |
| Apr. 3, 1986 | [JP] | Japan | 61-48907[U] |

[51] Int. Cl.4 .......................... C07F 11/46; C07F 7/04
[52] U.S. Cl. .......................... 221/10; 221/14; 221/196; 221/197; 221/225
[58] Field of Search .................... 453/1, 16, 18, 29, 37; 194/206, 207; 221/9, 10, 13, 14, 175, 176, 191, 194, 195, 196, 197, 224, 225; 198/336, 631; 414/32, 117, 417

[56] References Cited

U.S. PATENT DOCUMENTS

| | | | |
|---|---|---|---|
| 2,734,620 | 2/1956 | Fischer et al. | 221/175 X |
| 3,228,431 | 1/1966 | Merki | 221/10 x |
| 3,447,707 | 6/1969 | Furst | 414/414 |
| 3,687,316 | 8/1972 | Wahle | 414/417 X |
| 4,190,066 | 2/1980 | Burnside | 221/129 X |
| 4,469,245 | 9/1984 | Fish et al. | 221/225 |
| 4,482,282 | 11/1984 | Wildmoser | 414/417 X |

FOREIGN PATENT DOCUMENTS

| | | | |
|---|---|---|---|
| 2168024 | 6/1986 | United Kingdom | 414/32 |

*Primary Examiner*—Kevin P. Shaver
*Assistant Examiner*—Edward S. Ammeen
*Attorney, Agent, or Firm*—Koda and Androlia

[57] ABSTRACT

A coin exchanging machine has a coin case disposed at the bottom of a casing for accommodating a plurality of coin bundles, a coin pushing mechanism for pushing laterally a row of coin bundles piled up in the coin case, and a coin transferring mechanism for receiving a row of coin bundles from the coin case by pushing the coin bundles by the coin pushing mechanism and for feeding the coin bundles one by one into a coin accommodating space in response to the discharge of the coin bundles.

14 Claims, 11 Drawing Sheets

BULK LOADED COIN DISPENSING MACHINE

BACKGROUND OF THE INVENTION

This invention relates to a coin exchanging machine for exchanging money such as bank notes for coins as money or token coins for game machines.

In general, in a bank or game house, coin exchanging machines are used for exchanging bank notes for coins corresponding to the value of the bank notes.

In these conventional coin exchanging machines, a large number of coins are stacked one by one in a coin accommodating cylinder, the coins are delivered by a coin delivery device one by one from the bottom of the cylinder into a coin outlet when a customer feeds some bank notes into a coin exchanging machine.

These conventional coin exchanging machines have a defect that the number of coins to be stacked is restricted because each coin is stacked separately without being wrapped in the accommodating cylinder. Accordingly, in a bank or game house where customers use the coin exchanging machines frequently, the coins must be often supplied into the machines. This work is troublesome and needs extra persons.

SUMMARY OF THE INVENTION

It is an object of this invention to provide a coin exchanging machine in which a large number of coins can be accommodated to decrease the number of coin supplying operation for supplying coin into the machine and which has a compact construction.

According to this invention, there is provided a coin exchanging machine for exchanging money such as bank notes for coins as money or token coins for game machines, which comprises: (a) casing means; (b) money inlet means through which money is inserted into the machine, disposed on a front face of the casing; (c) coin tray means for discharging coin bundles one by one, disposed at a lower portion of a coin accommodating space for piling up vertically a plurality of coin bundles in a state wherein each bundle is laid horizontally; (d) coin case means disposed detachably at the bottom of the casing means for accommodating a plurality of coin bundles in a state wherein each bundle is laid horizontally with the axis of each bundle extending laterally; (e) coin pushing means for pushing a row of coin bundles laterally at one time by pushing the side ends of rows of coin bundles piled up in the coin case means; and (f) coin transferring means for receiving a row of coin bundles pushed by the coin pushing means to transfer the coin bundles into the coin accommodating space located at a position higher than the coin case means, the coin-transferring means being movable vertically in a state wherein a conveyor is extended in the direction perpendicular to the axis of each coin bundle in the coin case means, a row of coin bundles being received by the conveyor in a position where the conveyor is located along one side face of the coin case means, the conveyor feeding coin bundles into the coin accommodation space one by one in response to consumption of the coin bundles.

The nature, utility, and further features of this invention will be more clearly apparent from the following detailed description with respect to preferred embodiments of the invention when read in conjunction with the accompanying drawings briefly described below.

DETAILED DESCRIPTION OF THE INVENTION

Figure 1:
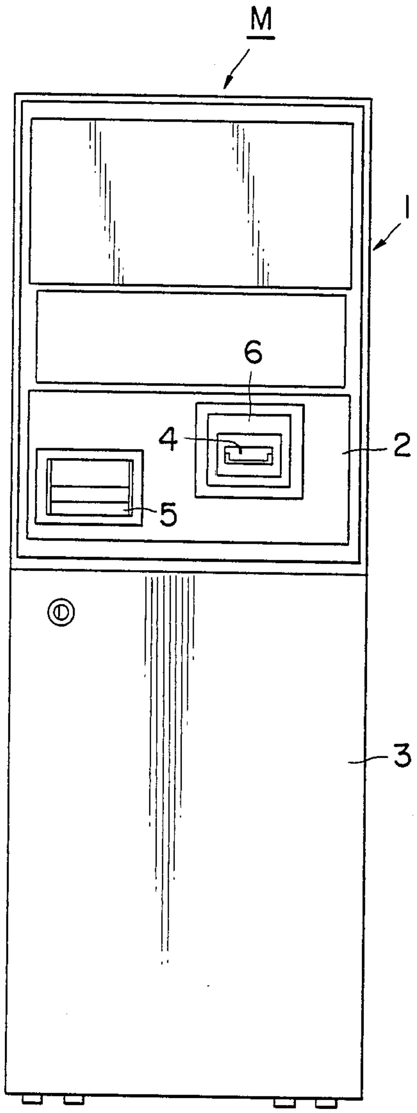
FIG. 1 is a front view of a coin exchanging machine according to this invention.
Figure 2:
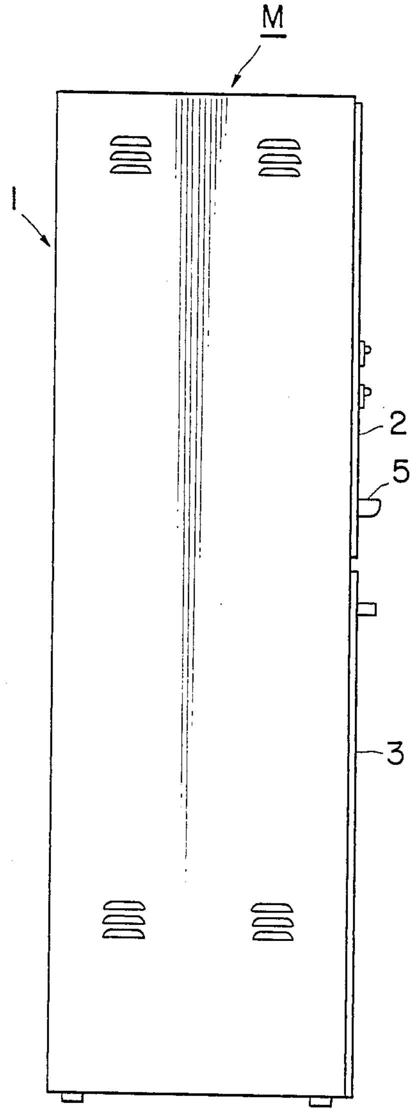
FIG. 2 is a side view of the coin exchanging machine.
Figure 3:
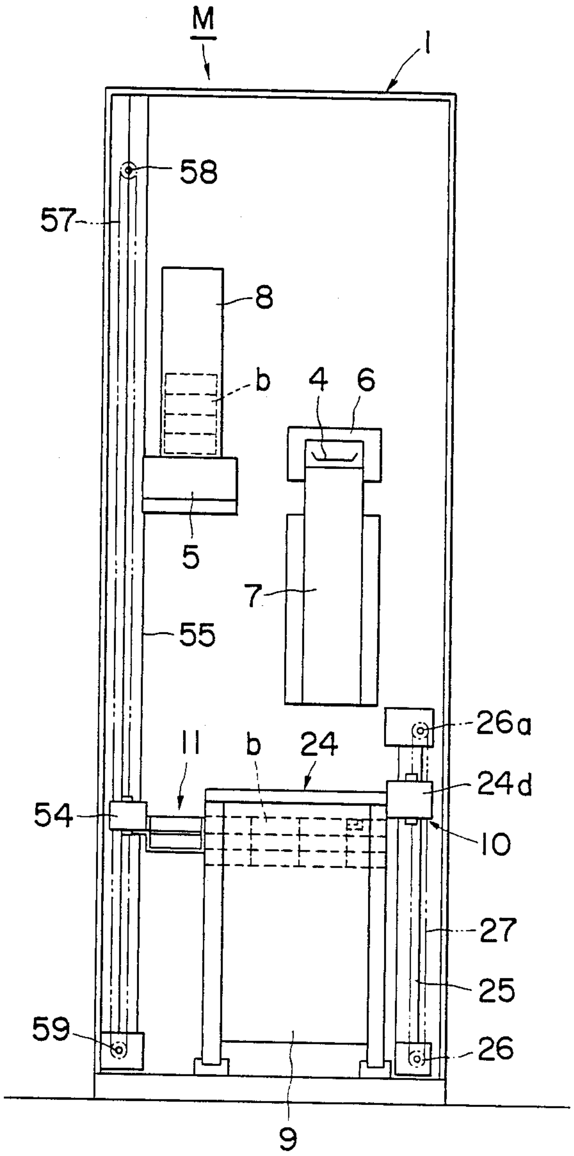
FIG. 3 is a front view of the inside of the coin exchanging machine.

In FIGS. 1, 2 and 3, a coin exchanging machine M used in a bank or game house, has a casing 1 at the upper part of which a front panel 2 is provided and at the lower part of which an openable lower cover 3 is provided. In the front panel 2 is provided a bank note inlet 4 into which bank notes are inserted by a customer and a coin tray 5 into which coins corresponding to the value of the inserted bank notes are delivered.

Adjacent to the bank note inlet 4 is provided a bank note discriminating portion 6 for distinguishing between false and genuine bank notes under which a bank note accommodating box 7 is provided. The coin tray 5 is located at the bottom of a coin accommodating space 8 for piling up a plurality of bundles of coins in a vertical row.

At the lower part of the casing 1 is provided a coin case 9 for piling up a large number of bundles of coins therein in a state wherein each bundle b is laid down in the horizontal direction. Above the coin case 9 is provided a coin pushing mechanism 10 for pushing a plurality of coin bundles b located at the uppermost position of the piles of coin bundles b in the horizontal (lateral) direction while on the left side of the coin case 9 as viewed in FIG. 3 is provided a coin transferring mechanism 11 for receiving a row of coin bundles b pushed by the coin pushing mechanism 10 to transfer the coin bundles b toward the coin accommodating space 8.

Figure 4:
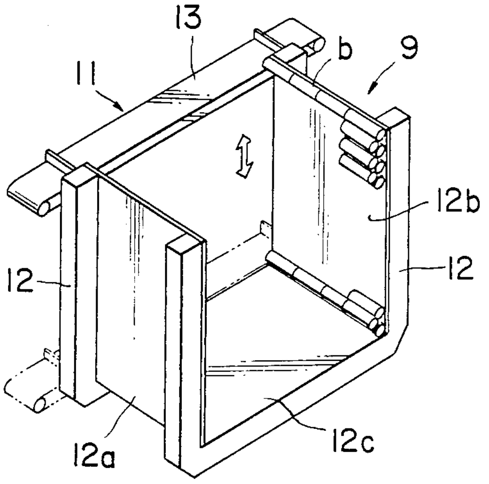
FIG. 4 is a perspective view of a coin case for piling up a large number of coin bundles.
Figure 5:
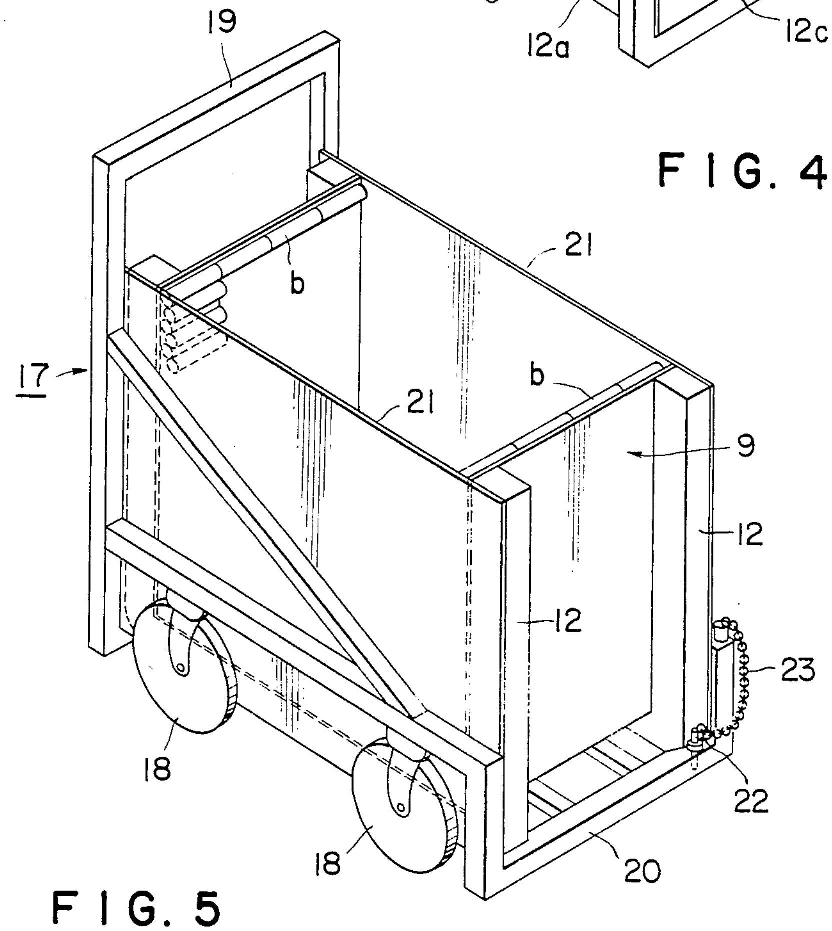
FIG. 5 is a perspective view of a coin carriage in which the coin case is placed.

The coin case 9 has a U-shape in which two U-shaped frames 12, 12 are disposed on the opposite sides of the coin case 9 as shown in FIG. 4. The front, rear and bottom faces of the coin case 9 are closed with three front, rear and bottom plates, 12*a*, 12*b*, 12*c*, respectively. However, the opposite side faces of the coin case 9 are open so that each row of coin bundles b can be pushed in the lateral direction.

On one side of the two open side faces is disposed a conveyor 13 forming a part of the coin transferring mechanism 11, which can receive a row of coin bundles.

In the coin case 9, a large number of coin bundles b are accommodated. For example, four bundles are disposed in an aligned manner in the lateral direction to form one column. A large number of combined columns are piled up in the vertical and horizontal directions. Each bundle has forty coins therein wrapped with a sheet of wrapping paper.

The coin case 9 is carried by a carriage 17 with four casters 18. The carriage 17 has a bundle frame 19, a bottom frame 20 and two side plates 21, 21. These side plates 21 close the two open side faces of the coin case 9 in order to prevent the coin bundles b from dropping from the opposite sides of the coin case 9 during transferring the coin case 9. A stopper 22 with a chain 23 is detachably provided on the front frame of the bottom frame 20 in order to prevent the coin case 9 from sliding down from the carriage 17.

The coin pushing mechanism 10 has a box-like frame 24 comprising a front frame 24*a*, two side frames 24*b*, 24*b* and a rear frame 24*c*. The rear frame 24*c* has two guide frames 24*d*, 24*d* at its opposite lateral ends. Each guide frame 24*d* has four guide rollers r, r, . . . r which are rotable along a guide rail 25 and the box-like frame 24 is moved vertically by a drive motor 26 located at the bottom of the casing 1 through a chain 27 fixed to the rear frame 24*c* at its ends. Each guide rail 25 has a pulley 26*a* at its upper end (FIG. 3).

Figure 6:
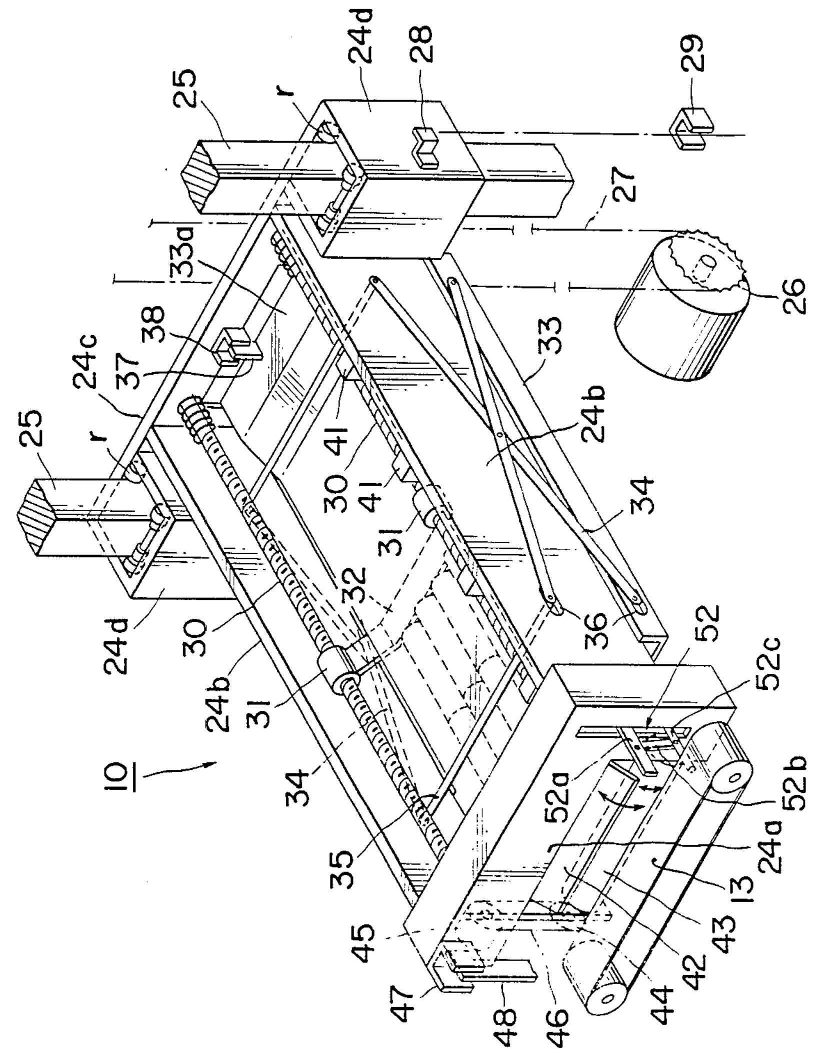
FIG. 6 is a perspective view of a coin pushing mechanism.
Figure 7:
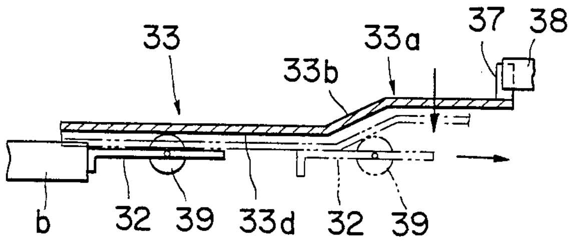
FIG. 7 is a longitudinally sectional view of a coin sensing plate.
Figure 8:
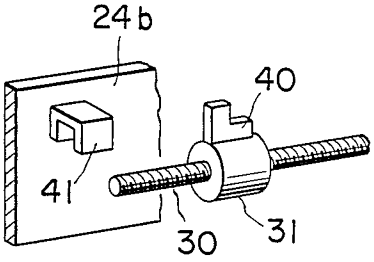
FIG. 8 is a perspective view showing a mechanism for stopping a pushing plate at a predetermined position.

On the side face of one of guide frames is provided a sensing piece 28 which is adapted to intercept light of a photo-sensor 29 when the box-like frame 24 reaches its lowermost limit. Along the two side frames 24*b*, 24*b* are disposed two screw bars 30, 30 which are synchronously rotated by a drive motor (not shown). Each screw bar 30 has a guide member 31 moved on the bar 30 in response to the rotation of the bar 30 and a pushing plate 32 is bridged between the two guide members 31 so that its front end pushes laterally the tail end of the rearmost row of coin bundles b. At the bottom of the box-like frame 24 is provided a sensing plate 33 for detecting the existence of coin bundles b. The sensing plate 33 is large enough to cover an area which the coin bundles b are piled up in the coin case 9. The sensing plate 33 is suspended, at its lateral ends, from the side frames 24*b* through two parallel links 34 so as to be movable vertically. The parallel links 34 are connected to each other by two lateral connecting bars 35, 35. The two front ends of each parallel link 34 are slidably engaged with two elongated openings 36, 36 in which the front ends of the link 34 can move horizontally when the link 34 expands and shrinks. The sensing plate 33 has a projecting plate 33*a* at its rear portion. The projecting plate 33*a* comprises an inclined portion 33*b* and a horizontal portion 33*c* on which a vertical plate 37 is erected for cooperating with a photo-sensor 38 as shown in FIGS. 6 and 7

The pushing plate 32 has a roller 39 which lifts the sensing plate 33 for separating the lower surface of the plate 33 from the upper surfaces of the coin bundles when the pushing plate 32 is located under the main portion 33*d* of the sensing plate 33 in order to enable the pushing plate 32 to push the coin bundles smoothly. When the pushing plate 32 is located under the horizontal portion 33*c* of the projecting plate 33*a*, the sensing plate 33 is permitted to be lowered until the sensing plate 33 contacts the upper surfaces of the coin bundles. At this time the vertical plate 37 still intercepts the light of the photo-sensor 38. That is, in this condition, the sensor 38 is detecting the existence of the coin bundles b. If all coin bundles b at a height position are pushed and if the pushing plate 32 is returned to an initial position, that is, a position under the projecting plate 33*a*, the sensing plate 33 is lowered to a position where the vertical plate 37 comes out of the photo-sensor 38 because of no coin bundles at the height position. At this time, the sensor 38 outputs a signal for driving the drive motor 26 so that the box-like frame 24 is moved downward. When the sensing plate 33 is lowered until it contacts the upper surfaces of the coin bundles b located at the next lower height position, the vertical plate 37 is inserted into the sensor 38 thereby to stop the drive motor 26. At this time, the pushing plate 32 is ready for pushing the coin bundles located at the next lower height position.

One of the guide members 31 moved along the screw bars 30 has a vertical plate 40 for cooperating with a plurality of photo-sensors 41, 41, . . . 41 which are fixed to the inner surface of one of the side frames 24*b* at a certain interval corresponding to the length of each coin bundles. When the pushing plate 32 pushes rows of coin bundles b toward the conveyor 13, the vertical plate 40 reaches each sensor 41 to stop the rotation of the screw bars 30. After the pushing plate 32 has finished pushing the last row of coin bundles at a height position, the pushing plate 32 is returned to the above initial position. Each sensor 41 controls these movements of the pushing plate 32.

Figure 10:
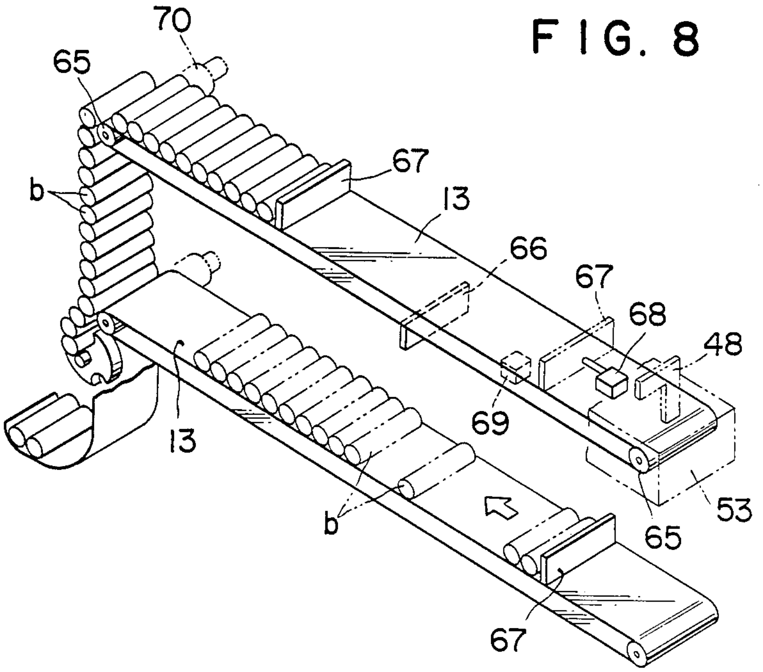
FIG. 10 is a perspective view showing a structure for feeding coin bundles into the coin accommodating space.
Figure 11:
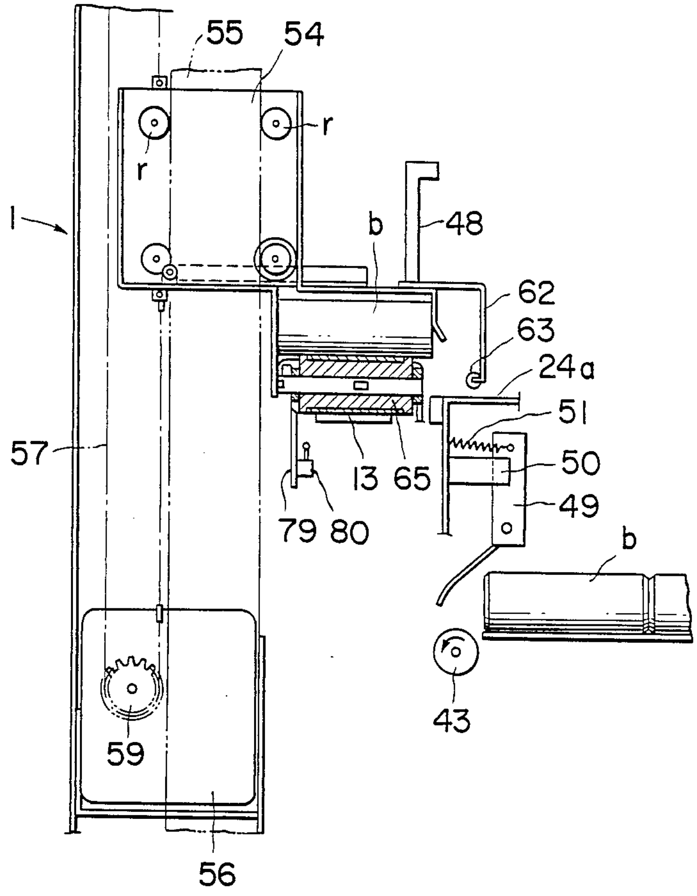
FIG. 11 is a front view showing a state wherein a conveyor with coin bundles thereon is moved toward the coin accommodating space.
Figure 12:
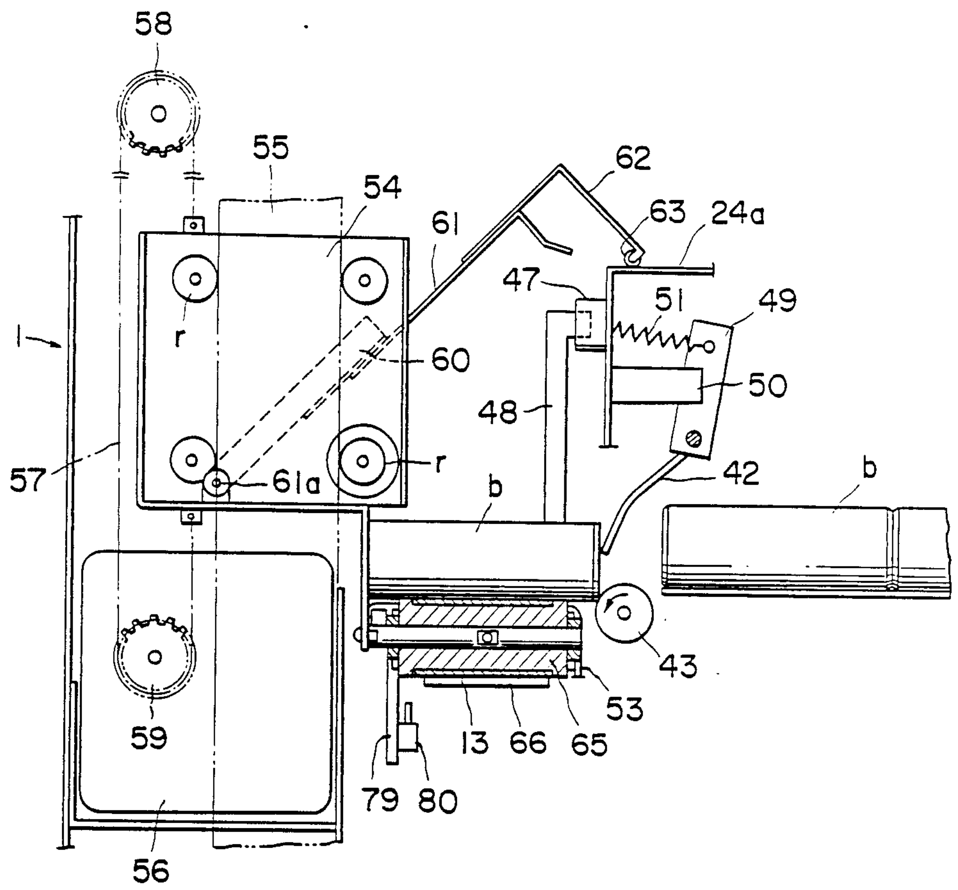
FIG. 12 is a front view showing a state wherein the conveyor receives coin bundles from the inside of the coin case.
Figure 23:
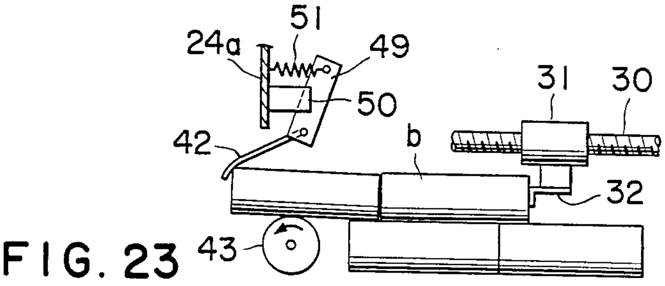

In the front frame 24*a*, a swingable plate 42 is provided for detecting whether or not a row of coin bundles b are transferred from the inside of the coin case 9 onto the conveyor 13 as shown in FIGS. 6, 11, 12 and 23. At the lower portion of the front frame 24*a* is rotatably provided a feeding roller 43 for helping transfer the coin bundles b onto the conveyor 13. The feeding roller 43 has a pulley 44 at its one end, which is connected to a drive motor 45 through an endless belt 46. A photo-sensor 47 is fixed to the lateral end of the front frame 24*a* on the same side as the drive motor 45. The photo-sensor 47 cooperates with a vertical plate 48 erected on the rear end of the conveyor frame 53 as shown in FIGS. 6, 10, 11 and 12. That is, when the upper end of the vertical plate 48 is inserted into the sensor 47, the vertical movement of the conveyor 13 is stopped in almost the same height position as the feeding roller 43 as shown in FIG. 12. At the same time, the sensor 47 outputs a signal for moving the pushing plate 32 and rotating the feeding roller 43 in order to transfer the coin bundles b onto the conveyor 13. When the front row of coin bundles are pushed toward the conveyor 13, the bundles b swing the swingable plate 42 upward thereby to swing a plate 49 connected to the swingable plate 42 so as to come out of the inside of the photo-sensor 50 as shown in FIG. 23. The plate 49 is normally located in the sensor 50 by the provision of a spring 51. The sensor 50 outputs a signal for stopping rotating the feeding roller 43 and moving the conveyor 13 upward.

In the front frame 24 on the opposite side of the sensor 47 is provided a stopper means 52 (FIG. 16) for preventing the foremost coin bundle of a, row of bundles placed on the conveyor from dropping forward. The stopper means 52 has a swinging lever **52*a*, a link 52*b* and an actuating lever 52*c* The swinging lever 52*a* is urged inward by a spring (not shown) and the actuating lever 52*c* rotates to swing the swinging lever 52*a* outward through the link 52*b* when the lower end of the conveyor frame 53 contacts the actuating lever 52*c***.

Figure 13:
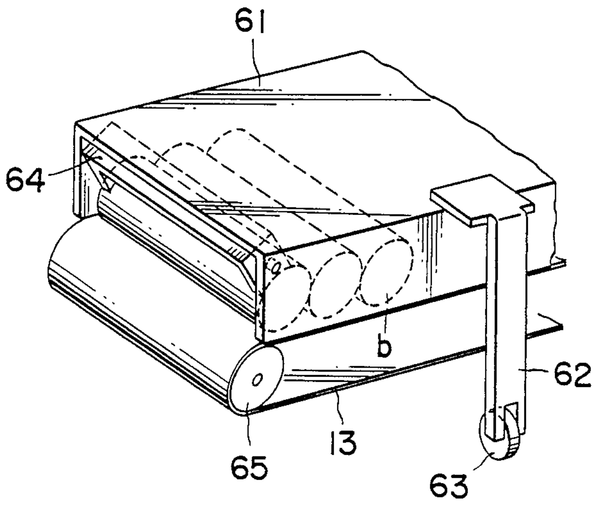
FIG. 13 is a partially perspective view of the coin transferring mechanism.
Figure 14:
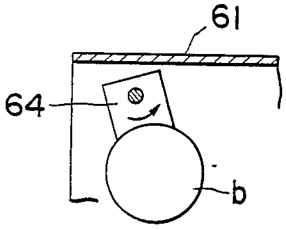
FIG. 14 is a sectional view of the front portion of a cover plate of the coin transferring mechanism.

The conveyor frame 53 is connected, at its lateral opposite ends, to two guide frames 54 with guide rollers r, r, . . . r, moving upward and downward along two guide rails 55. The guide frames are connected to a drive motor 56 through a chain 57 running between the upper gear 5 and the lower drive gear 59. Between the two guide rails 55 is provided a bracket 60 swingable about an axis 61 and the bracket 60 supports a coin cover plate 61 as shown in FIGS. 11, 12 and 13. The coin cover plate 61 is for preventing the coin bundles b from dropping from the conveyor 13 when the conveyor 13 is located in a position higher than the coin pushing mechanism 10. The cover plate 61 has a bracket 62 at its center in its longitudinal direction in order to open and close the cover plate 61. The bracket 62 has a roller 63 at its lower end. When the conveyor 13 is lowered to a position where a row of coin bundles b are fed onto the conveyor 13 by the pushing mechanism 10, the roller 63 contacts the upper surface of the front frame **24*a* of the box-like frame 24 to open the coin cover plate 61 as shown in FIG. 12. After the coin bundles b are fed onto the conveyor 13, the conveyor 13 is moved upward. At this time, the coin cover plate 61 is closed to prevent the coin bundles placed on the conveyor 13 from dropping outward during its upward movement. This state is shown in FIG. 11. At the front end of the coin cover plate 61 is swingably provided a coin stopper 64 engaging with the upper round surface of the foremost coin bundle b as shown in FIG. 14. The coin stopper 64 is urged by a spring (not shown) in the counter-clockwise direction as viewed in FIG. 14**.

Figure 17:
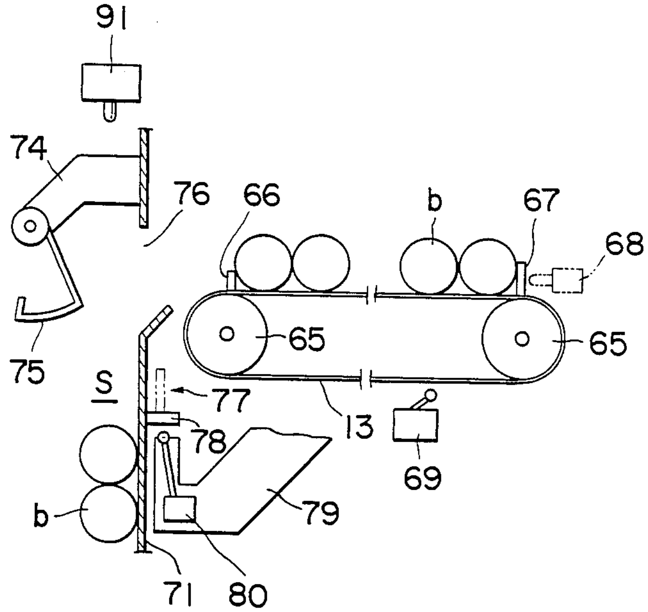
FIG. 17 is a side view showing a positional relationship the conveyor and the back plate.
Figure 21:
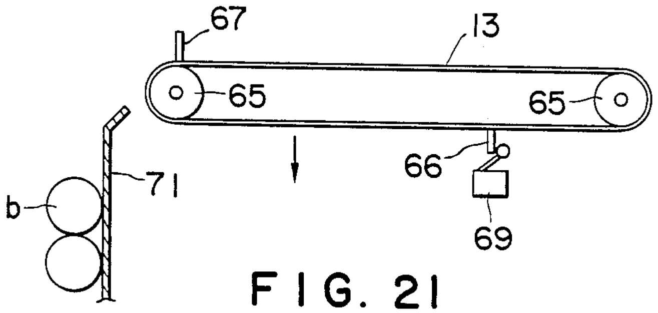

The conveyor 13 has two pulleys 65, 65 at its longitudinal opposite ends as shown in FIGS. 10 and 17. One of the pulleys 65 is rotated by a motor 70. On the conveyor 13 are provided two front and rear restriction plates 66, 67 between which a row of coin bundles b are placed. The rear restriction plate 67 is higher than the front plates 66 because the rearmost coin bundle b cannot be moved over the rear plate 67 when the conveyor 13 runs for transferring the coin bundles placed on the conveyor 13 into the coin accommodating space 8. The rear plate 67 abuts against a limit switch 68 in FIG. 17 and, at this time, the conveyor 13 is ready for receiving the coin bundles b. When all coin bundles b on the conveyor 13 are fed into the coin accommodating space 8, the front plate 66 actuates a limit switch 69 located under the conveyor 13 as shown in FIG. 21 so as to move the conveyor 13 downward to receive coin bundles b placed in the coin case 9.

Figure 15:
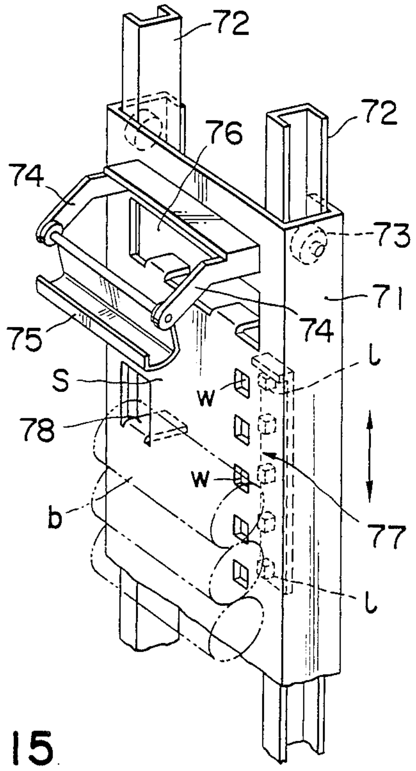
FIG. 15 is a perspective view of a back plate of the coin accommodating space.

The structure of the coin accommodating space 8 will now be explained with respect to FIGS. 9 and 15.

The space 8 defined by a front wall 70 with a vertical opening, a back plate 71 and two guide rails 72, 72. The back plate 71 is moved vertically along the vertical guide rails 72 via two rollers 73, 73 provided on the side portions of the back plate 71 so as to be rotatable in each rail 72. The back plate 71 has, at its upper portions, two brackets 74 for supporting a pusher 75 which abuts against the uppermost coin bundle b in the accommodating space 8 when the back plate 71 is lowered. The back plate 71 has, near the brackets 74, a feeding window 76 for feeding coin bundles b on the conveyor 13 into the coin accommodating space 8. On the lower side of the window 76 is provided a group of windows through which light emitted from a group of light emitting sources 1 as sensor means 77 passes in order to detecting the existence of the coin bundles b. The light emitting sources 1 are disposed in a vertically dotted manner through a length corresponding to an approximate height including two coin bundles piled up vertically. The sensor 77 normally detects the existence of the coin bundles located opposite to its lower part. While the sensor 77 detects any coin bundles, the motor 70 (FIG. 10) for moving the conveyor 13 is stopped. That is, a space S opposite to the upper part of the sensor 77 (FIGS. 15 and 17) is normally formed as a preliminary space for one bundle.

On the other lateral opposite side of the sensor 77 in the back plate 71 is formed a support projection 78 extending backward for engaging with the upper end of a bracket 79 (FIGS. 9, 11 and 17) which is provided at the front portion of the conveyor frame 53. The bracket 79 has a switch 80 for detecting the engagement of the upper end of the bracket 79 and the support projection 78. When the switch 80 detects the engagement of the two members, the motor 56 for moving the conveyor 13 is stopped. At this time, the front end of the conveyor 13 is opposed to the window 76 of the back plate 71.

Figure 9:
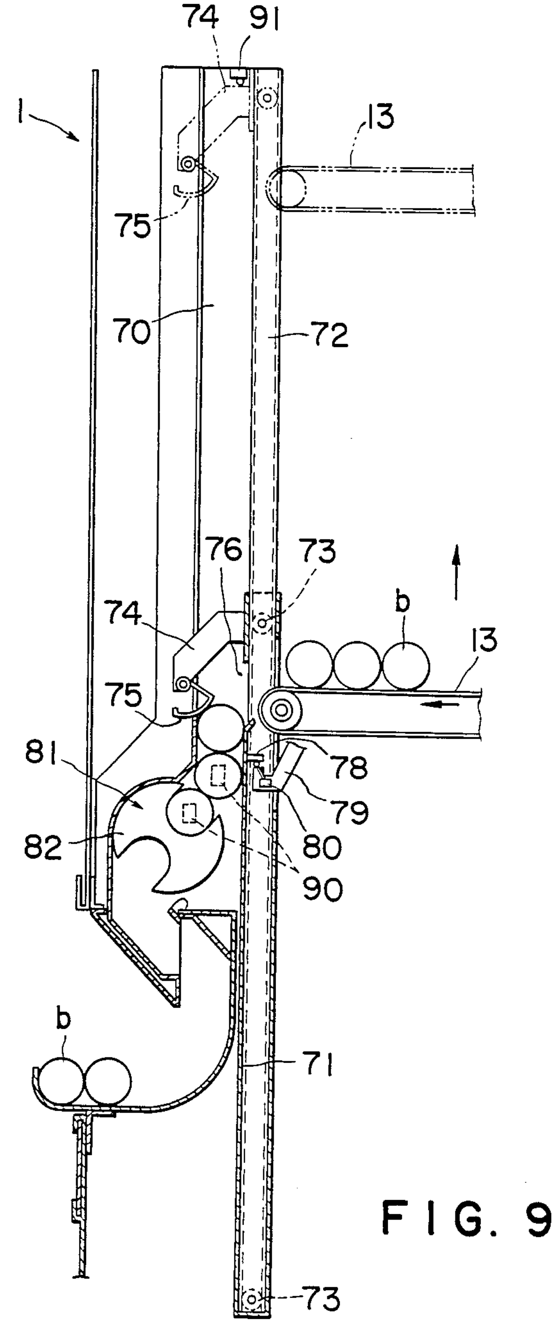
FIG. 9 is a vertically sectional view of a coin accommodating space.
Figure 16:
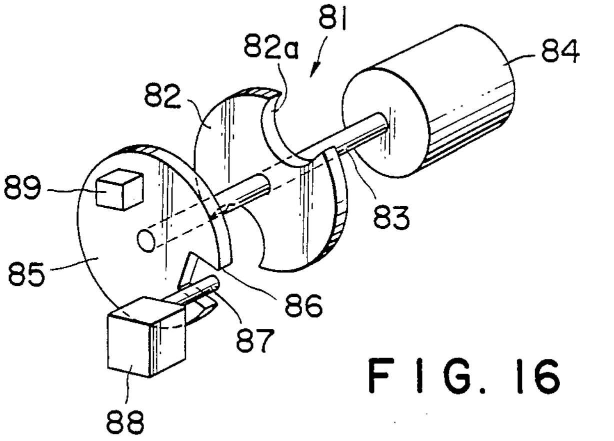
FIG. 16 is a perspective view showing a coin discharge portion.

At a lower portion of the coin accommodating space 8 is provided a coin discharge part 81, as shown in FIGS. 9 and 16, which discharges coin bundles b one by one in response to a signal of the bank note discriminating portion 6. The coin discharge part 81 comprises a coin discharge plate 82 in which two coin receiving openings 82, 82 are disposed symmetrically with respect to an axis 83 rotated by a motor 84 (FIG. 16). The motor 84 is fixed to the one end of the axis 83 and a locating plate 85 is fixed to the other end of the axis 83. The locating plate 85 has a cut away portion 86 for receiving a projection 87 of a solenoid 88. A photo-sensor 89 is disposed opposite to the periphery of the locating plate 85. When some bank notes are inserted into the inlet 4, the solenoid 88 retracts its projection 87 from the cut away portion 86 so as to permit the coin discharge plate 82 to rotate. When the coin discharge plate 82 is rotated through 180 degrees from an initial position, the sensor 89 detects the rotation of the locating plate 85 thereby to stop the motor 84. In that manner, the coin discharging plate 82 is rotated according to the value of the bank notes inserted into the inlet 4. Two photo-sensors 90, 90 are disposed opposite to the side faces of the two coin bundles b in the coin discharge portion 81, in order to detect the existence of the coin bundles in the coin discharge portion 81. At the uppermost position of the coin accommodating space 8 is provided a limit switch 91 contacting the upper face of the bracket 74 of the back plate 71 for stopping the upward movement of the conveyor 13.

Figure 18:
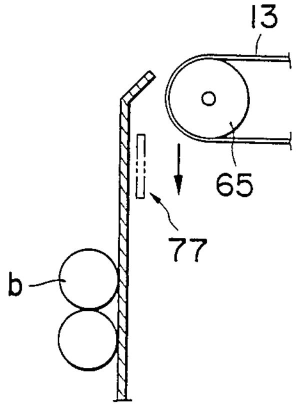
FIGS. 18 to 21 are views showing coin feeder operation in which coin bundles are fed into the coin accommodating space, respectively.
Figure 19:
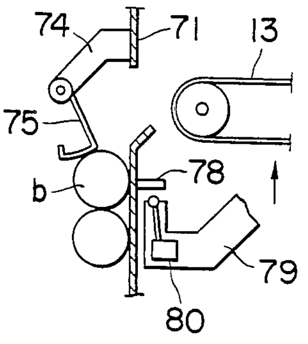
Figure 20:
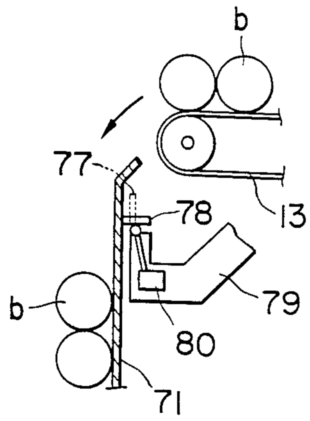

The operation of this machine will now be explained In FIG. 17, the conveyor 13 is located at the uppermost position with a certain number of coin bundles placed between the two restriction plates 66, 67. At this time, suppose that the sensor 77 detects the uppermost coin bundle b. With this state, if some coin bundles b are discharged from the coin discharge part 81 into the tray 5, the uppermost coin bundle b is lowered as shown in FIG. 18. As a result, the sensor 77 detects that there is no coin in a position opposite to the sensor 77 thereby to drive the motor 56 for the conveyor 13 so as to lower the conveyor 13 together with the back plate 71. When the back plate 71 is lowered to a certain distance and the coin pusher 75 supported by the bracket 74 abuts against the uppermost coin bundle, the switch 80 is slightly separated from the projection 78 thereby to stop the conveyor 13 and move it upward (FIG. 19). When the switch 80 contacts the projection 78 again, the upward movement of the conveyor 13 is stopped. Thereafter, the conveyor 13 is moved upward to a position where the sensor 77 detects non-existence of coin bundles b as shown in FIG. 20 and the conveyor motor 70 (FIG. 10) is driven to feed the foremost coin on the conveyor 13 into the space 8 through the window 76 of the back plate 71. At this time, as the sensor 77 detects the new coin bundle b, the conveyor 13 is moved upward again and then the next coin bundle b is fed into the space 8. In this manner, the coin bundles b are piled up one by one in the space 8 until the conveyor 13 reaches its uppermost position as shown in FIG. 9.

Figure 22:
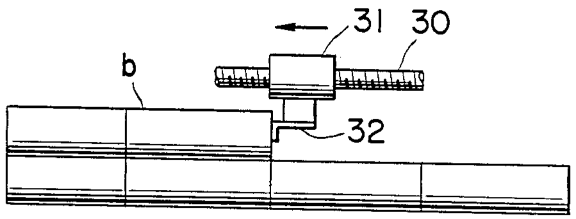
FIGS. 22 and 23 are views showing coin pushing operation by a pushing plate, respectively.

If all coin bundles b are fed from the conveyor 13 into the space 8, the front restriction plate 66 actuates the switch 69 thereby to move the conveyor 13 downward to receive a row of coin bundles from the coin case 9 (FIG. 21). During the downward movement of the conveyor 13, the two restriction plates 66, 67 are returned to the initial position. When the conveyor 13 is located in the position shown in FIG. 12, the foremost row of coin bundles in the direction where the coin bundles were pushed is transferred from the inside of the coin case 9 onto the conveyor 13. That is, in this condition, the sensor 47 detects the vertical plate 48 to start rotating the feeding roller 43 and moving the pushing plate 32 forward (laterally with respect to the casing 1) by the length of each coin bundle b as shown in FIGS. 22 and 23. When the pushing plate 32 is moved forward, the foremost row of coin bundles swings the swingable plate 42 to actuate the sensor 50. Then, after the foremost row of coin bundles b is placed completely on the conveyor 13, the pushing plate 13 is stopped by the function of the each sensor 41. At the same time, the feeding roller 43 is stopped and the conveyor 13 is then moved upward until the sensor 80 fixed to the conveyor frame 53 contacts the projection 78 of the back plate 71. After this, the conveyor 13 feeds the coin bundles b one by one into the coin accommodating space 8 in the above manner until the conveyor 13 reaches the uppermost position.

According to this invention, as the coin case 9 is placed at the bottom of the casing 1, the machine can stand steadily. Further, as this machine can deal with a large number of coin bundles, the number of coin supplying operations can be remarkably decreased.

What we claimed is:

1. A coin exchanging machine for exchanging money such as bank notes for coins as money or token coins for game machines, which comprises:

(a) case means;

(b) money inlet means through which money is inserted into the machine, disposed on a front face of the case means;

(c) coin tray means for discharging coin bundles one by one, disposed at a lower portion of a coin accommodating space for piling up vertically a plurality of coin bundles in a state wherein each bundle is laid horizontally;

(d) coin case means disposed detachably at the bottom of the case means for accommodating a plurality of coin bundles in a state wherein each bundle is laid horizontally with the axis of each bundle extending laterally;

(e) coin pushing means for pushing a row of coin bundles laterally at one time by pushing side ends of rows of coin bundles piled up in the coin case means; and (f) coin transferring means having a conveyor and means to vertically move the conveyor for directly receiving a row of coin bundles pushed by the coin pushing means to transfer the coin bundles into the coin accommodating space located at a position higher than the coin case means, the conveyor being movable vertically in a state wherein the conveyor is horizontally extended in a direction perpendicular to the axis of each coin bundle in the coin case means, a row of coin bundles being received by the conveyor in a stationary state in a position where the conveyor is located along one side face of the coin case means, the means to vertically move the conveyor moving the conveyor, while holding the coin bundles thereon, to a position where the coin bundles on the conveyor are directly fed by the conveyor in the coin accommodating space, one by one, through a coin feeding window in response to consumption of the coin bundles when the conveyor is horiontally driven.

2. A coin exchanging machine according to claim 1 wherein the coin pushing means has a box-like frame movable vertically, a pushing plate for pushing laterally a plurality of coin bundles disposed in rows at the uppermost position of piles of coin bundles in the coin case means and a sensing plate for detecting the existence of the coin bundles in the coin case means, supported vertically movably by the box-like frame.

3. A coin exchanging machine according to claim 2, wherein the sensing plate is a flat plate to cover an area where the coin bundles are disposed and is supported by the box-like frame through parallel links, the sensing plate cooperating with sensor means for detecting a vertical movement of the sensing plate.

4. A coin exchanging machine according to claim 2, wherein the pushing plate has two guide members at its opposite ends which are moved along two rotatable screw bars, a plurality of sensors being disposed along a side frame of the box-like frame in order to control the lateral movement of the guide members.

5. A coin exchanging machine according to claim 2, wherein the box-like frame has a front frame in which a swingable plate is provided for detecting whether or not a row of coin bundles have been fed onto the conveyor located adjacent to the front frame.

6. A coin exchanging machine according to claim 3, wherein the sensing plate has a projecting portion at its rear end, the projecting portion having an inclined portion and cooperating with a roller provided with the pushing plate for pushing laterally the coin bundles, the roller functioning to raise slightly the sensing plate when the pushing plate pushes the coin bundles, the sensing plate being permitted to lower when the pushing plate is located at the rear end of the sensing plate.

7. A coin exchanging machine according to claim 5, wherein the front frame has a feeding roller extending along the front frame for promoting a row of coin bundles to move onto the conveyor smoothly.

8. A coin exchanging machine according to claim 5, wherein the front frame has stopper means at its side end for preventing the foremost coin bundles having been transferred onto the conveyor from dropping forward.

9. A coin exchanging machine according to claim 1, wherein the conveyor of the coin transferring means has two restriction plates erected separately on the surface of the conveyor, between which a row of coin bundles are placed, the coin transferring means having two sensor means one of which is for detecting an initial state for receiving a row of coin bundles from the coin case means and the other of which is for detecting whether or not all coin bundles placed on the conveyor have been fed into the coin accommodating space.

10. A coin exchanging machine according to claim 1, wherein the coin transferring means has a coin cover plate for covering a row of coin bundles placed on the conveyor in order to prevent the coin bundles from dropping out of the conveyor, the cover plate being swingable so as to be opened when the conveyor receives coin bundles from the coin case means.

11. A coin exchanging machine according to claim 10, wherein the cover plate has a coin stopper at its forward end for preventing the foremost coin bundle from dropping forward.

12. A coin exchanging machine according to claim 1, wherein the coin accommodating space is defined by a fixed front wall and a back plate which is movable vertically in a state wherein the back plate is supported by a front portion of the conveyor, the back plate having said window through which coin bundles are fed, one by one, into the coin accommodating space, sensor means for detecting the existence of coin bundles and means for determining a positional relationship between the conveyor and the back plate.

13. A coin exchanging machine according to claim 1, wherein a coin discharge portion is formed at a lower position of the coin accommodating space, the coin discharge portion comprising a coin discharge plate for discharging coin bundles one by one into the coin tray means, the coin discharge plate cooperating with a locating plate for locating the coin discharge plate, the locating plate being provided with safety means for preventing the coin discharge plate from rotating except a time when some genuine money is inserted into the inlet means.

14. A coin exchanging machine according to claim 1, wherein the coin transferring means feeds coin bundles into the coin accommodating space through the coin feeding window while moving vertically in response to the amount of the coin bundles in the coin accommodating space.

* * * * *